(12) United States Patent
Gagliardoni et al.

(10) Patent No.: US 12,505,076 B2
(45) Date of Patent: Dec. 23, 2025

(54) METHOD FOR USING AN ORAM DATABASE BY A TERMINAL EQUIPMENT, CORRESPONDING COMPUTER PROGRAM PRODUCT AND DEVICE

(71) Applicant: NAGRAVISION SARL, Cheseaux-sur-Lausanne (CH)

(72) Inventors: Tommaso Gagliardoni, Cheseaux-sur-Lausanne (CH); Nils Amiet, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 0 days.

(21) Appl. No.: 18/710,247

(22) PCT Filed: Nov. 18, 2022

(86) PCT No.: PCT/EP2022/082420
§ 371 (c)(1),
(2) Date: May 15, 2024

(87) PCT Pub. No.: WO2023/089098
PCT Pub. Date: May 25, 2023

(65) Prior Publication Data
US 2025/0005000 A1  Jan. 2, 2025

(30) Foreign Application Priority Data

Nov. 19, 2021  (EP) .................................... 21209186

(51) Int. Cl.
*G06F 16/21* (2019.01)
*G06F 16/27* (2019.01)
*G06F 21/60* (2013.01)

(52) U.S. Cl.
CPC ............ *G06F 16/211* (2019.01); *G06F 16/27* (2019.01); *G06F 21/602* (2013.01)

(58) Field of Classification Search
None
See application file for complete search history.

(56) References Cited

U.S. PATENT DOCUMENTS 9,904,793 B2 * 2/2018 Chow ................. H04L 63/0428
10,248,324 B2 * 4/2019 Pass ....................... G06F 3/0604
(Continued)

OTHER PUBLICATIONS

International Search Report and Written Opinion issued Feb. 20, 2023, in PCT/EP2022/082420, 12 pages.
Sajin Sasy et al: "ZeroTrace : Oblivious Memory Primitives from Intel SGX", Proceedings 2018 Network and Distributed System Security Symposium, Jan. 1, 2018, XP055571240, Reston, VA DOI: 10.14722/ ndss.2018.23239 ISBN: 978-1-891562-49-5.

(Continued)

*Primary Examiner* — Backhean Tiv
(74) *Attorney, Agent, or Firm* — POLSINELLI LLP

(57) ABSTRACT

A method for using, by a terminal equipment, an Oblivious Random-Access Memory (ORAM) database created in a remote server. A third-party device is connected to the terminal equipment and to the remote server through a communications network and executes receiving a request, sent by the terminal equipment, for having the third-party device to initiate the creation of the ORAM database in the remote server, initializing the creation of the ORAM database in the remote server by sending to the remote server ORAM database elements, generating metadata associated to the ORAM database created in the remote server, and sending, to the terminal equipment, the metadata for allowing the terminal equipment to use the ORAM database created in the remote server without going through the third-party device.

20 Claims, 2 Drawing Sheets

(56) References Cited

U.S. PATENT DOCUMENTS

| | | | |
|---|---|---|---|
| 10,592,685 B2* | 3/2020 | Yeo | H04L 9/0631 |
| 10,922,340 B1* | 2/2021 | Yu | G06F 40/279 |
| 11,250,159 B2* | 2/2022 | Kramer | G06F 21/6254 |
| 11,593,516 B2* | 2/2023 | Patel | H04L 9/008 |
| 11,669,624 B2* | 6/2023 | Yeo | H04L 9/0894 |
| | | | 713/189 |
| 11,727,124 B2* | 8/2023 | Yeo | G06F 16/2471 |
| | | | 713/193 |
| 2014/0053099 A1* | 2/2014 | Groten | G01C 21/3647 |
| | | | 715/790 |
| 2018/0314847 A1* | 11/2018 | Yeo | H04L 9/085 |
| 2020/0175192 A1* | 6/2020 | Yeo | H04L 9/0819 |
| 2021/0390202 A1* | 12/2021 | Yeo | H04L 63/10 |
| 2025/0005000 A1* | 1/2025 | Gagliardoni | H04L 63/0435 |

OTHER PUBLICATIONS

Emil Stefanov et al: "Path ORAM: An Extremely Simple Oblivious RAM Protocol", IACR, International Association for Cryptologic Research, vol. 20140114:010337, Jan. 13, 2014, pp. 1-25, XP061015309.

Sahin Cetin et al: "TaoStore: Overcoming Asynchronicity in Oblivious Data Storage", 2016 IEEE Symposium on Security and Privacy (SP), IEEE, May 22, 2016 (May 22, 2016), pp. 198-217, XP032945700, DOI: 10.1109/SP.2016.20.

Thang Hoang et al: "MACAO: A Maliciously-Secure and Client-Efficient Active ORAM Framework", IACR, International Association for Cryptologic Research, vol. 20200221:223029, Feb. 18, 2020, pp. 1-18, XP061035333, Retrieved from the Internet: URL:http://eprint.iacr.org/2020/203.pdf [retrieved on Feb. 18, 2020].

* cited by examiner

METHOD FOR USING AN ORAM DATABASE BY A TERMINAL EQUIPMENT, CORRESPONDING COMPUTER PROGRAM PRODUCT AND DEVICE

1. FIELD OF THE DISCLOSURE

The field of the disclosure is that of the back-up of data on a distant server, e.g. in the cloud.

More specifically, the disclosure relates to a method for such back-up of data on a distant server from a terminal equipment.

The disclosure can be of interest in any field wherein such terminal equipment needs to back-up data on a distant server. This is the case for instance for terminals equipment like smartphones, tablets, etc.

2. TECHNOLOGICAL BACKGROUND

In the sequel, we focus more particularly on describing an existing problem in the field of mobile devices (e.g. smartphones, tablets, etc.), with which the inventors of the present patent application were confronted. The invention is of course not limited to this particular field of application, but is of interest for the back up of data on a distant server for any type of terminal equipment (e.g. home servers).

It is known to back up data from a terminal equipment on a cloud provider service, e.g. such as Google Drive. This is often convenient but clashes with privacy needs, because the cloud storage provider can be untrusted, and can access confidential data stored by the user. Encryption of such data is not sufficient to guarantee privacy, because the cloud provider can still see whether the user reads or writes files and which parts of the data are being accessed. That information can be used to track the user's activity.

Oblivious Random-Access Memories (ORAMs) are known solutions for addressing those privacy issues. More particularly, ORAMs are cryptographic schemes that protect the user's privacy by obfuscating the access patterns, at the cost of some performance loss. This performance loss is significant and makes ORAM solutions barely practical, especially on equipment with limited computing power like mobile devices. Indeed, one can see multiple limitations on mobile devices:
- The initial setup of an ORAM is quite slow, as the storage needs to be initialized and encrypted;
- The ORAM needs to store client-side metadata, which is necessary to operate the ORAM (e.g. a position map of the data blocks of the database, etc.). If this client metadata is lost or the device breaks, the encrypted data becomes unusable and is forever lost.

There is thus a need for a solution for improving the confidentiality of the data stored in a remote server by a terminal equipment, even in the case where the terminal equipment has limited computing power.

3. SUMMARY

A particular aspect of the present disclosure relates to a method for using, by a terminal equipment, an ORAM database created in a remote server. A third-party device is connected to the terminal equipment and to the remote server through a communications network. According to such method, the third-party device executes: receiving a request, sent by the terminal equipment through the communications network, for having the third-party device to initiate the creation of the ORAM database in the remote server. Responsive to receiving the request, the third-party device executes:
- initializing the creation of the ORAM database in the remote server by sending to the remote server, through the communications network, ORAM database elements;
- generating metadata associated to the ORAM database created in the remote server; and
- sending, to the terminal equipment through the communications network, the metadata for allowing the terminal equipment to use the ORAM database created in the remote server without going through the third-party device.

Thus, the present disclosure proposes a new and inventive solution for improving the confidentiality of the data stored in the remote server by a terminal equipment, even in the case where the terminal equipment has limited computing power (e.g. a smartphone or a tablet).

More particularly, the proposed solution allows such terminal equipment to use an ORAM database by delegating to a third-party device the most computing demanding step relating to the use of such ORAM database, i.e. the creation (or initialization) itself of the ORAM database in the remote server. In particular, once the ORAM database is created, the metadata necessary for using the ORAM database are provided to the terminal equipment that can thus further access directly (i.e. without going through the third-party device) to the created ORAM database. The confidentiality of the data is thus insured for the terminal equipment despite the use of the third-party device for the creation of the ORAM database.

In some embodiments, the initializing the creation of the ORAM database comprises:
- generating a temporary symmetric encryption key;
- encrypting initial data blocks of the ORAM database with the temporary encryption key; and
- sending, to the remote server through the communications network, the encrypted initial data blocks as part of the ORAM database elements.

In some embodiments, the metadata comprise the temporary symmetric encryption key.

Thus, the terminal equipment can decrypt the data blocks of the ORAM database as initialized by the third-party device.

In some embodiments, the sending to the terminal equipment the metadata comprises establishing an encrypted and authenticated communication channel with the terminal equipment through the communications network. The metadata is sent through the encrypted and authenticated communication channel.

In some embodiments, the third-party device executes, responsive to the sending to the terminal equipment the metadata: deleting the metadata stored in the third-party device.

Thus, the terminal equipment takes ownership of the ORAM database.

In some embodiments, the third-party device executes, after the sending to the terminal equipment the metadata: receiving, from the terminal equipment through the communications network, the metadata associated to the ORAM database in an encrypted form based on a secret encryption key different from the temporary symmetric encryption key.

Thus, a backup of the metadata is stored into the third-party device. Furthermore, the secret encryption key being unknown to the third-party device, the third-party device cannot use the metadata to access the ORAM database. The confidentiality of the data stored in the ORAM database is preserved.

According to another aspect of the disclosure, the terminal equipment being connected to the third-party device and to the remote server through the communications network, the terminal equipment executes:

sending a request, to the third-party device through the communications network, for having the third-party device to initiate the creation of the ORAM database in the remote server; and receiving, from the third-party device through the communications network, metadata allowing the terminal equipment to use the ORAM database created in the remote server without going through the third-party device.

In some embodiments, the received metadata comprise a temporary symmetric encryption key used by the third-party device to encrypt initial blocks of the ORAM database stored in the remote server.

In some embodiments, the receiving from the third-party device the metadata comprise establishing an encrypted and authenticated communication channel with the third-party device through the communications network, the metadata are received through the encrypted and authenticated communication channel.

In some embodiments, the terminal equipment executes: sending, to the third-party device through the communications network, an access token so that the third-party device can access the remote server for initializing the creation of the ORAM database in the remote server.

In some embodiments, the terminal equipment executes, after the receiving from the third-party device the metadata: revoking the access token sent to the third-party device so that the third-party device cannot access any more the ORAM database in the remote server.

Thus, the confidentiality of the data stored in the ORAM database is improved.

In some embodiments, the terminal equipment executes a writing of at least one data block in the ORAM database, the writing comprising:

encrypting the at least one data block of the ORAM database with a secret encryption key different from the temporary symmetric encryption key;

sending, to the remote server through the communications network, the encrypted at least one data block for storing in the ORAM database; and updating the metadata for taking into account the sending of the encrypted at least one data block.

In some embodiments, the terminal equipment executes: generating the secret encryption key.

In some embodiments, the terminal equipment executes a reading of at least one encrypted data block of the ORAM database, the reading comprising:

receiving, from the remote server through the communications network, the at least one encrypted data block of the ORAM database;

decrypting the encrypted data block based on: the temporary encryption key if the metadata indicates that the encrypted data block is an initial block of the ORAM database encrypted by the third-party device; or the secret encryption key if the metadata indicates that the encrypted data block is a data block of the ORAM database encrypted by the terminal equipment.

In some embodiments, the terminal equipment executes: sending, to the third-party device through the communications network, the metadata in an encrypted form based on the secret encryption key.

In some embodiments, the ORAM database is of a pathORAM type.

In some embodiments, the metadata comprise position map of the database and stash information.

Another aspect of the present disclosure relates to a computer program product comprising program code instructions for implementing the above-mentioned method for using an ORAM database (in any of the different embodiments discussed above), when said program is executed on a computer or a processor.

Another aspect of the present disclosure relates to a device configured for implementing all or part of the steps of the above-mentioned method for using an ORAM database as executed by the terminal equipment (in any of the different embodiments discussed above). Thus, the features and advantages of this device are the same as those of the corresponding steps of said method. Therefore, they are not detailed any further.

Another aspect of the present disclosure relates to a device configured for implementing all or part of the steps of the above-mentioned method for using an ORAM database as executed by the third-party device (in any of the different embodiments discussed above). Thus, the features and advantages of this device are the same as those of the corresponding steps of said method. Therefore, they are not detailed any further.

4. LIST OF FIGURES

Other features and advantages of embodiments shall appear from the following description, given by way of indicative and non-exhaustive examples and from the appended drawings, of which:

5. DETAILED DESCRIPTION

In all of the Figures of the present document, the same numerical reference signs designate similar elements and steps.

Figure 1:
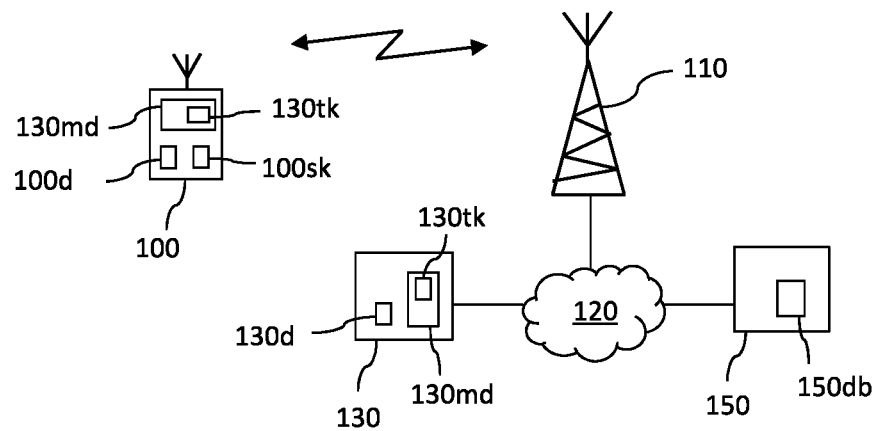
FIG. 1 illustrates a terminal equipment in communication with a third-party device and with a remote server according to one embodiment of the present disclosure.

Referring now to FIG. 1, we describe a terminal equipment 100 in communication with a third-party device 130 and with a remote server 150 according to one embodiment of the present disclosure.

The terminal equipment 100 (e.g. a smartphone, a tablet equipped with a wireless communication module) is in communication with the third-party device 130 and with the remote server 150 (e.g. a server of a storage provider) through a communications network. The communications network is a wireless communications network, e.g. a third Generation Partnership Project, hereafter 3GPP, 2G, 3G, 4G or 5G cellular network. Such communications network comprises a base station 110 that implements the air interface with the terminal equipment 100 and a core network 120 that interfaces with the third-party device 130 and the server 150.

However, in other embodiments the communications network is a wired communications network, e.g. when the terminal equipment 100 is not a mobile equipment (e.g. when the terminal equipment 100 is a home server).

Back to FIG. 1, according to the method of the present disclosure, which is further detailed below in relation with FIG. 2, the terminal equipment 100 delegates to the third-party device 130 the creation of an ORAM database 150*db* in the server 150. The third-party device 130 thus initiate the creation of the ORAM database 150*db* in the server 150 and generates metadata 130*md* associated to the database 150*db*. The metadata 130*md* are sent to the terminal equipment 100 for allowing the terminal equipment 100 to use directly the database 150*db*, i.e. without going through the third-party device 130. For instance, the metadata 130*md* comprise a "position map" (e.g. a lookup table) that allows to "undo the scramble" and link back the positions of the blocks in the database 150*db* to their logical ordering that can be used by the client, i.e. the terminal equipment 100 in the present case.

The third-party device 130 also generates a temporary symmetric encryption key 130*tk* for encrypting initial data blocks of the database 150*db*. For instance, the metadata 130*md* generated by the third-party device 130 comprise the temporary symmetric encryption key 130*tk* so that the terminal equipment 100 can decrypt the data blocks of the database 150*db* as initialized by the third-party device 130.

However, in other embodiments, the third-party device 130 does not use such temporary symmetric encryption key 130*tk* for encrypting initial data blocks of the database 150*db*. In such embodiments, the metadata 130*md* don't comprise the temporary symmetric encryption key 130*tk*.

Back to FIG. 1, the terminal equipment 100 uses a secret encryption key 100*sk*, different from the temporary symmetric encryption key 130*tk*, for encrypting the data blocks to be stored in the database 150*db*. Thus, as the third-party device 130 has no knowledge of the secret encryption key 100*sk*, the third-party device 130 cannot access the data blocks stored in the database 150*db* by the terminal equipment 100.

However, in other embodiments, the terminal equipment 100 does not use a secret encryption key 100*sk* different from the temporary symmetric encryption key 130*tk* for encrypting the data blocks to be stored in the database 150*db*.

Back to FIG. 1, the terminal equipment 100 comprises a device 100*d* comprising means configured for implementing all or part of the corresponding steps of the method for using an ORAM database discussed below in relation with FIG. 2. The means implemented in the device 100*d* are further discussed below in relation with FIG. 3.

The third-party device 130 comprises a device 130*d* comprising means configured for implementing all or part of the corresponding steps of the method for using an ORAM database discussed below in relation with FIG. 2. The means implemented in the device 130*d* are further discussed below in relation with FIG. 4.

Figure 2:
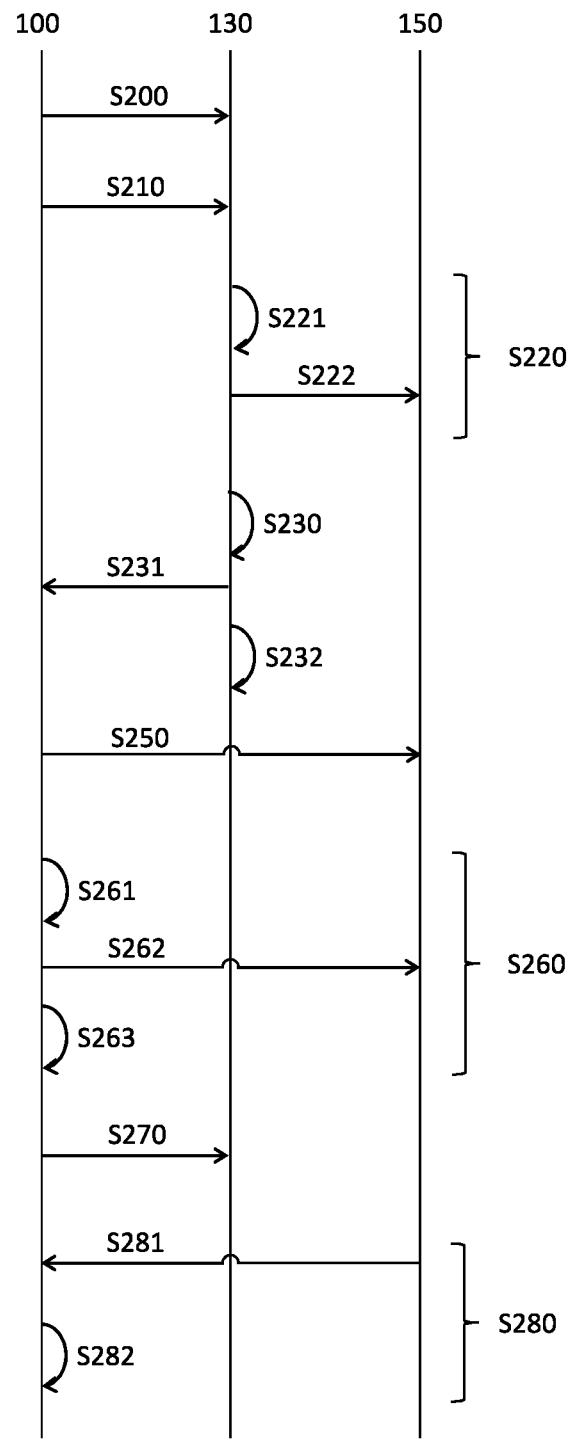
FIG. 2 illustrates the steps of a method for using, by the terminal equipment of FIG. 1, an ORAM database created in the remote server of FIG. 1 according to one embodiment of the present disclosure.

Referring now to FIG. 2, we describe a method for using, by the terminal equipment 100, the ORAM database 150*db* according to one embodiment of the present disclosure.

More particularly, in a step S200, the terminal equipment 100 sends, to the third-party device 130 through the communications network, an access token. The access token allows the third-party device 130 to access the remote server 150 to initiate the creation of the database 150*db* in the remote server 150.

Correspondingly, in step S200, the third-party device 130 receives the access token sent by the terminal equipment 100.

For instance, the terminal equipment 100 sends a request to the remote server 150 for receiving such access token. Responsive to receiving the request sent by the terminal equipment 100, the remote server 150 generates and sends the access token to the terminal equipment 100. Such access token can be used to access the remote server 150 by any device that owns the token. The access token is therefore sent by the terminal equipment 100 to the third-party device 130 so that the third-party device 130 can access the remote server 150, e.g. for initiating the creation of the database 150*db*.

However, in other embodiments, such mechanism involving access token is not implemented. For instance, the third-party device 130 may have already granted access to the remote server 150, e.g. in case of general agreement between parties managing the third-party device 130 and the remote server 150.

Back to FIG. 2, in a step S210, the terminal equipment 100 sends a request, to the third-party device 130 through the communications network, for having the third-party device 130 to initiate the creation of the database 150*db* in the server 150.

Correspondingly, in step S210, the third-party device 130 receives the request sent by the terminal equipment 100.

Responsive to receiving the request sent by the terminal equipment 100, the third-party device 130 initiates the creation of the database 150*db* in the remote server 150 by sending to the remote server 150 database elements during a step S220. The initiation of the creation of the database 150*db* is thus delegated from the terminal equipment 100 to the third-party device 130.

More particularly, in a step S221, the third-party device 130 generates a temporary symmetric encryption key 130*tk* and encrypts initial data blocks of the database 150*db* with the temporary encryption key 130*tk*. In a step S222, the third-party device 130 sends to the remote server 150 the encrypted initial data blocks as part of the database elements.

However, in other embodiments, the third-party device 130 does not use such temporary symmetric encryption key 130*tk* for encrypting initial data blocks of the database 150*db*. In some embodiments, the database elements comprise additional information allowing the creation of the database 150*db* including e.g. the size of the database 150*db* to be created. In some embodiments, the initiation of the database 150*db* is further delegated from the third-party device 130 to the remote server 150.

Back to FIG. 2, in a step S230, the third-party device 130 generates metadata 130*md* associated to the database 150*db* created in the remote server 150 (e.g. the "position map" as discussed above in relation with FIG. 1). In a step S231, the third-party device 130 sends to the terminal equipment 100 the metadata 130*md* for allowing the terminal equipment 100 to use directly the database 150*db* created in the remote server 150.

Correspondingly, in step S231, the terminal equipment 100 receives the metadata 130*md* sent by the third-party device 130.

In some embodiments wherein the third-party device 130 uses a temporary symmetric encryption key 130*tk* for encrypting initial data blocks of the database 150*db*, the metadata 130*md* comprise the temporary symmetric encryption key 130*tk*. Accordingly, the terminal equipment 100 can decrypt the data blocks of the database 150*db* as initialized by the third-party device 130.

In some embodiments, the third-party device 130 and the terminal equipment 100 establish an encrypted and authenticated communication channel to communicate with each other through the communications network. The third-party device 130 sends to the terminal equipment 100 the metadata 130*md* through the encrypted and authenticated communication channel. Correspondingly, the terminal equipment 100 receives the metadata 130*md* sent by the third-party device 130 through the encrypted and authenticated communication channel. Accordingly, the exchange of information between the terminal equipment 100 and the third-party device 130 is secured.

In some embodiments, the database 150*db* is of a pathORAM type, which is particularly suited for mobile devices. In such embodiments, the metadata 130*md* comprise stash information in addition of the "position map" of the database 150*db*.

Back to FIG. 2, in a step S232, responsive to the sending of the metadata 130*md* to the terminal equipment 100 during step S231, the third-party device 130 deletes the generated metadata 130*md*. The metadata 130*md* as generated by the third-party device 130 are thus not kept stored in the third-party device 130. Therefore, the terminal equipment 100 takes ownership of the database 150*db*.

However, in other embodiments, the third-party device 130 does not delete the metadata 130*md* that has been generated.

Back to FIG. 2, in a step S250, after having received the metadata 130*md*, the terminal equipment 100 revokes the access token sent to the third-party device 130 during step S200. Thus, the third-party device 130 cannot access any more the database 150*db* in the remote server 150.

However, in embodiments wherein the step S200 is not implemented, the terminal equipment 100 does not implement the step S250.

Back to FIG. 2, after the execution of the steps S200 up to S250, the terminal equipment 100 is now able to use the database 150*db* for writing data block(s) stored therein.

For instance, in a step S260, the terminal equipment 100 executes a writing of one (or more) data block in the database 150*db*.

In that respect, in a step S261, the terminal equipment 100 generates a secret encryption key 100*sk* different from the temporary symmetric encryption key 130*tk* and encrypts the data block(s) with the secret encryption key 100*sk*. In a step S262, the terminal equipment 100 sends to the remote server 150 the encrypted data block(s) for storing in the database 150*db*. In a step S263, the terminal equipment 100 updates the metadata 130*md* for taking into account the sending of the encrypted data block(s).

However, in other embodiments, the terminal equipment 100 does not use a secret encryption key 100*sk* different from the temporary symmetric encryption key 130*tk* for encrypting the data blocks to be stored in the database 150*db*.

Back to FIG. 2, in a step S270, the terminal equipment 100 sends to the third-party device 130 the metadata 130*md* in an encrypted form based on the secret encryption key 100*sk*. Correspondingly, in step S270, the third-party device 130 receives the metadata 130*md* in the encrypted form based on the secret encryption key 100*sk* sent by the terminal equipment 100. Thus, a backup of the metadata 130*md* is stored into the third-party device 130. Furthermore, the secret encryption key 100*sk* being unknown to the third-party device 130, the third-party device 130 cannot use the metadata 130*md* to access the database 150*db*. The confidentiality of the data stored in the database 150*db* is preserved despite the backup of the metadata 130*md* into the device 130.

However, in other embodiments, the terminal equipment 100 does not execute the step S270 and the metadata 130*md* is not sent to the third-party device 130 in order to be stored as a back-up.

Back to FIG. 2, after the execution of the steps S200 up to S250, the terminal equipment 100 is also able to use the database 150*db* for reading data block(s) stored therein.

For instance, in a step S280, the terminal equipment 100 executes a reading of one (or more) data block stored in the database 150*db*.

In that respect, in a step S281, the remote server 150 sends to the terminal equipment 100 one (or more) encrypted data block of the database 150*db*, e.g. responsive to a request sent by the terminal equipment 100 for such data block(s). Correspondingly, in step S281, the terminal equipment 100 receives from the remote server 150 one (or more) encrypted data block of the database 150*db*. In a step S282, the terminal equipment 100 decrypts the encrypted data block(s) based on:

- the temporary encryption key 130*tk* if the metadata 130*md* indicates that the corresponding encrypted data block is an initial block of the database 150*db* encrypted by the third-party device 130; or
- the secret encryption key 100*sk* if the metadata 130*md* indicates that the corresponding encrypted data block is a data block of the database 150*db* encrypted by the terminal equipment 100.

In other embodiments wherein the temporary encryption key 130*tk* and/or the secret encryption key 100*sk* are not used for encrypting the data block(s) stored in the database 150*db*, the terminal equipment 100 does not necessarily decrypts the data block(s) stored in the database 150*db*. In any case, the terminal equipment 100 relies on the information in the metadata 130*md* for deciding if a decryption is required and, if relevant, based on which encryption key.

Figure 3:
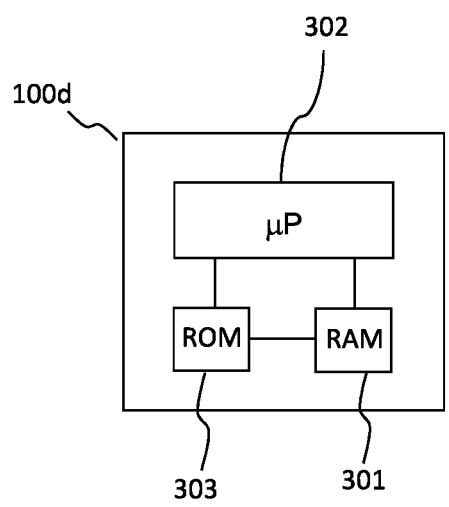
FIG. 3 illustrates an example of the structural blocks of a device allowing all or part of the corresponding steps of the method of FIG. 2 to be implemented by the terminal equipment of FIG. 1.

Referring now to FIG. 3, we describe an example of the structural blocks implemented in the device 100*d*.

More particularly, in order to be able to implement all or part of the steps of the method discussed above in relation with FIG. 2 as executed by the terminal equipment 100 (according to any of the embodiments disclosed above), in some embodiments the device 100*d* comprises:

- a non-volatile memory 303 (e.g. a read-only memory (ROM), a hard disk, a flash memory, etc.);
- a volatile memory 301 (e.g. a random-access memory or RAM) and a processor 302.

The non-volatile memory 303 is a non-transitory computer-readable carrier medium. It stores executable program code instructions, which are executed by the processor 302 in order to enable implementation of some steps of the method described above (method for using an ORAM database) in the various embodiment disclosed above in relationship with FIG. 2.

Upon initialization, the aforementioned program code instructions are transferred from the non-volatile memory 303 to the volatile memory 301 so as to be executed by the processor 302. The volatile memory 301 likewise includes registers for storing the variables and parameters required for this execution.

The steps of the method for using an ORAM database as executed by the terminal equipment 100 may be implemented equally well:

- by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a CD-ROM, a DVD-ROM, a USB key) or non-detachable; or
- by a dedicated machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but that it may also be implemented in hardware form or any form combining a hardware portion and a software portion.

Figure 4:
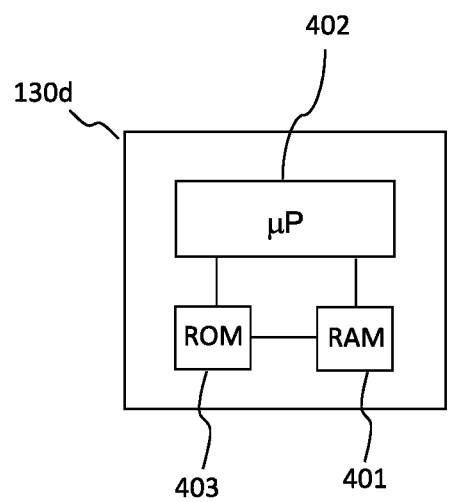
FIG. 4 illustrates an example of the structural blocks of a device allowing of all or part of the corresponding steps of the method of FIG. 2 to be implemented by the third-party device of FIG. 1.

Referring now to FIG. 4, we describe an example of the structural blocks implemented in the device 130d.

More particularly, in order to be able to implement all or part of the steps of the method discussed above in relation with FIG. 2 as executed by third-party device 130 (according to any of the embodiments disclosed above), in some embodiments the device 130d comprises:

- a non-volatile memory 403 (e.g. a read-only memory (ROM), a hard disk, a flash memory, etc.);
- a volatile memory 401 (e.g. a random-access memory or RAM) and a processor 402.

The non-volatile memory 403 is a non-transitory computer-readable carrier medium. It stores executable program code instructions, which are executed by the processor 402 in order to enable implementation of some steps of the method described above (method for using an ORAM database) in the various embodiment disclosed above in relationship with FIG. 2.

Upon initialization, the aforementioned program code instructions are transferred from the non-volatile memory 403 to the volatile memory 401 so as to be executed by the processor 402. The volatile memory 401 likewise includes registers for storing the variables and parameters required for this execution.

The steps of the method for using an ORAM database as executed by third-party device 130 may be implemented equally well:

- by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a CD-ROM, a DVD-ROM, a USB key) or non-detachable; or
- by a dedicated machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but that it may also be implemented in hardware form or any form combining a hardware portion and a software portion.

The invention claimed is:

1. A method of implementing, by a terminal equipment, an Oblivious Random-Access Memory, hereafter ORAM, database created in a remote server, the method comprising:
   executing, by a third-party device being connected to the terminal equipment and to the remote server through a communications network, receiving a request, sent by the terminal equipment through the communications network, for having the third-party device to initiate creation of the ORAM database in the remote server; and
   responsive to said receiving the request and by the third-party device:
      initializing the creation of the ORAM database in the remote server by sending to the remote server, through the communications network, ORAM database elements,
      generating metadata associated to the ORAM database created in the remote server, and
      sending, to the terminal equipment through the communications network, the metadata for allowing the terminal equipment to use the ORAM database created in the remote server without going through the third-party device.

2. The method according to claim 1, wherein said initializing the creation of the ORAM database further comprises:
   generating a temporary symmetric encryption key;
   encrypting initial data blocks of the ORAM database with the temporary symmetric encryption key; and
   sending, to the remote server through the communications network, the encrypted initial data blocks as part of the ORAM database elements.

3. The method according to claim 2, wherein said metadata comprise said temporary symmetric encryption key.

4. The method according to claim 3, further comprising: by the third-party device and responsive to said sending to the terminal equipment the metadata, deleting the metadata stored in the third-party device.

5. The method according to claim 3, further comprising: by the third-party device and after said sending to the terminal equipment the metadata, receiving, from the terminal equipment through the communications network, the metadata associated to the ORAM database in an encrypted form based on a secret encryption key different from the temporary symmetric encryption key.

6. The method according to claim 2, further comprising: by the third-party device and responsive to said sending to the terminal equipment the metadata, deleting the metadata stored in the third-party device.

7. The method according to claim 2, further comprising: by the third-party device and after said sending to the terminal equipment the metadata, receiving, from the terminal equipment through the communications network, the metadata associated to the ORAM database in an encrypted form based on a secret encryption key different from the temporary symmetric encryption key.

8. The method according to claim 1, further comprising: by the third-party device and responsive to said sending to the terminal equipment the metadata, deleting the metadata stored in the third-party device.

9. The method according to claim 1, further comprising: by the third-party device and after said sending to the terminal equipment the metadata, receiving, from the terminal equipment through the communications network, the metadata associated to the ORAM database in an encrypted form based on a secret encryption key different from a temporary symmetric encryption key.

10. A non-transitory computer-readable storage medium comprising program code instructions for implementing the method according to claim 1.

11. A method of implementing, by a terminal equipment, an Oblivious Random-Access Memory, hereafter ORAM, database created in a remote server, the method comprising:
executing, by the terminal equipment being connected to a third-party device and to the remote server through a communications network:
sending a request, to the third-party device through the communications network, for having the third-party device to initiate creation of the ORAM database in the remote server, and
receiving, from the third-party device through the communications network, metadata allowing the terminal equipment to use the ORAM database created in the remote server without going through the third-party device.

12. The method according to claim 11, wherein said metadata comprise a temporary symmetric encryption key used by the third-party device to encrypt initial blocks of the ORAM database stored in the remote server.

13. The method according to claim 12, further comprising, by the terminal equipment, sending, to the third-party device through the communications network, an access token so that the third-party device can access the remote server for initializing the creation of the ORAM database in the remote server.

14. The method according to claim 11, further comprising, by the terminal equipment, sending, to the third-party device through the communications network, an access token so that the third-party device can access the remote server for initializing the creation of the ORAM database in the remote server.

15. The method according to claim 14, further comprising, by the terminal equipment and after said receiving from the third-party device the metadata, revoking the access token sent to the third-party device so that the third-party device cannot access any more the ORAM database in the remote server.

16. The method according to claim 11, further comprising, by the terminal equipment, a writing at least one data block in the ORAM database by:
encrypting the at least one data block of the ORAM database with a secret encryption key different from a temporary symmetric encryption key,
sending, to the remote server through the communications network, the encrypted at least one data block for storing in the ORAM database, and
updating the metadata for taking into account the sending of the encrypted at least one data block.

17. The method according to claim 11, further comprising, by the terminal equipment, a reading of at least one encrypted data block of the ORAM database by:
receiving, from the remote server through the communications network, the at least one encrypted data block of the ORAM database, and
decrypting the encrypted data block based on a temporary symmetric encryption key if the metadata indicates that the encrypted data block is an initial block of the ORAM database encrypted by the third-party device or based on a secret encryption key if the metadata indicates that the encrypted data block is a data block of the ORAM database encrypted by the terminal equipment.

18. The method according to claim 11, further comprising, by the terminal equipment, sending, to the third-party device through the communications network, the metadata in an encrypted form based on a secret encryption key.

19. A device implementing, by a terminal equipment, an Oblivious Random-Access Memory, hereafter ORAM, database created in a remote server, the device comprising:
a processor or a dedicated computing machine configured to:
receive a request, sent by the terminal equipment through a communications network, for having a third-party device to initiate the creation of the ORAM database in the remote server, and
responsive to said receiving the request:
initialize the creation of the ORAM database in the remote server by sending to the remote server, through the communications network, ORAM database elements,
generate metadata associated to the ORAM database created in the remote server, and
send, to the terminal equipment through the communications network, the metadata for allowing the terminal equipment to use the ORAM database created in the remote server without going through the third-party device.

20. A device implementing, by a terminal equipment, an Oblivious Random-Access Memory, hereafter ORAM, database created in a remote server, the device comprising:
a processor or a dedicated computing machine configured to:
send a request, to a third-party device through a communications network, for having the third-party device to initiate creation of the ORAM database in the remote server, and
receive, from the third-party device through the communications network, metadata allowing the terminal equipment to use the ORAM database created in the remote server without going through the third-party device.

* * * * *